United States Patent [19]

Gibson

[11] Patent Number: 4,624,093
[45] Date of Patent: Nov. 25, 1986

[54] SINGLE-WIRE CARRIER EDGE PROTECTOR TRIM STRIP

[75] Inventor: Harold R. Gibson, Frederick, Okla.

[73] Assignee: Schlegel Corporation, Rochester, N.Y.

[21] Appl. No.: 599,492

[22] Filed: Apr. 12, 1984

[51] Int. Cl.⁴ .............................................. E04F 19/02
[52] U.S. Cl. ........................................ 52/716; 49/490; 428/122; 428/358
[58] Field of Search .......................... 52/399–403, 52/648, 716–718; 49/490, 491; 428/122, 358

[56] References Cited

U.S. PATENT DOCUMENTS

| | | | |
|---|---|---|---|
| 3,107,939 | 10/1963 | Meyer | 52/718 |
| 3,108,338 | 10/1963 | Stec et al. | 49/479 |
| 3,172,800 | 3/1965 | Truesdell | 52/648 |
| 3,177,534 | 4/1965 | Millhouse | 49/490 |
| 3,198,689 | 8/1965 | Lansing | 428/121 |
| 4,107,898 | 8/1978 | Andrzejewski | 52/716 |
| 4,214,036 | 7/1980 | Bright | 428/358 |
| 4,304,816 | 12/1981 | Bright et al. | 52/716 |
| 4,310,164 | 1/1982 | Mesnel | 52/718 |
| 4,343,845 | 8/1982 | Burden et al. | 428/122 |
| 4,413,033 | 11/1983 | Weichman | 52/716 |
| 4,517,233 | 5/1985 | Weichman | 428/108 |

OTHER PUBLICATIONS

The Random House College Dictionary, revised edition, 1980, p. 133 the term—Sight—published by Random House.

Primary Examiner—John E. Murtagh
Assistant Examiner—Andrew Joseph Rudy
Attorney, Agent, or Firm—Cumpston & Shaw

[57] ABSTRACT

A channel-shaped single-wire carrier is coated with elastomeric material to form an edge protector trim strip of substantially U-shaped cross section. The single-wire carrier is formed from a continuous metallic serpentine wire having oppositely facing looped edge portions or bights joined by lengths of wire extending transversely and spaced from one another longitudinally of the carrier. Some of the bights are located along one edge line, others along the opposite edge line, and still others along a line parallel to and interposed between the edge lines. The bights cyclically recur in a predetermined order to provide a wire carrier having a longitudinally extending reinforced portion. A plurality of strands of material extending longitudinally of the carrier are interwoven with the lengths of wire to maintain the spaced relation.

14 Claims, 9 Drawing Figures

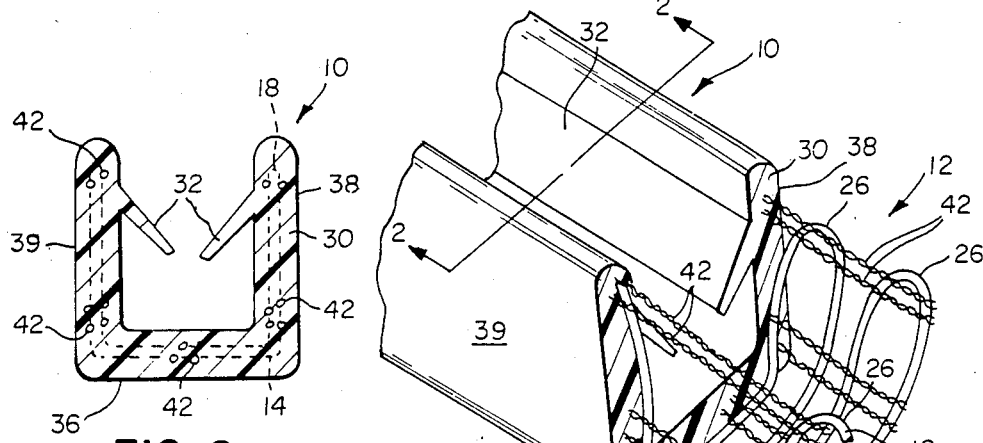
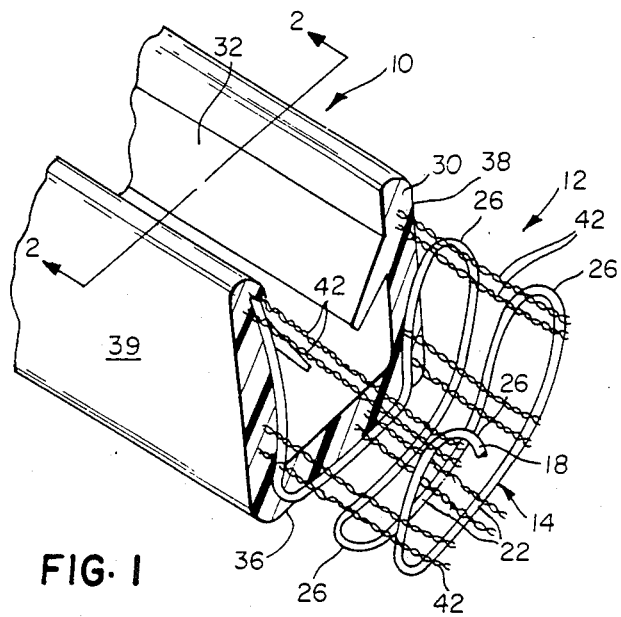
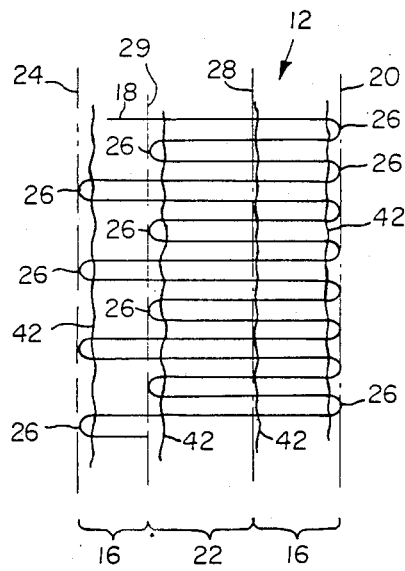
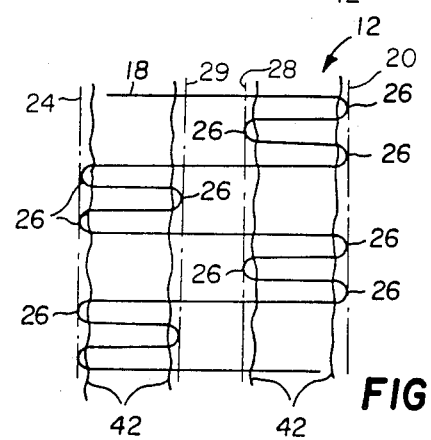
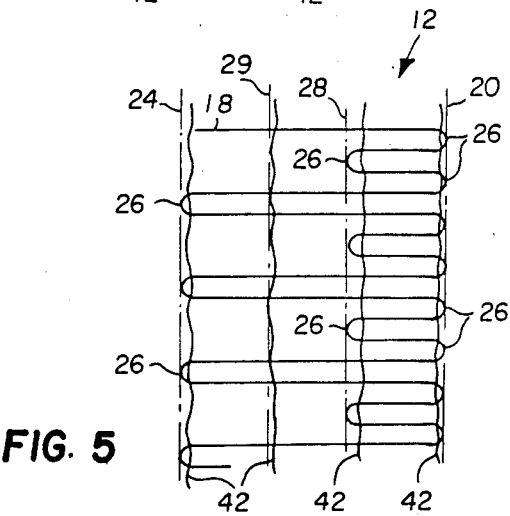

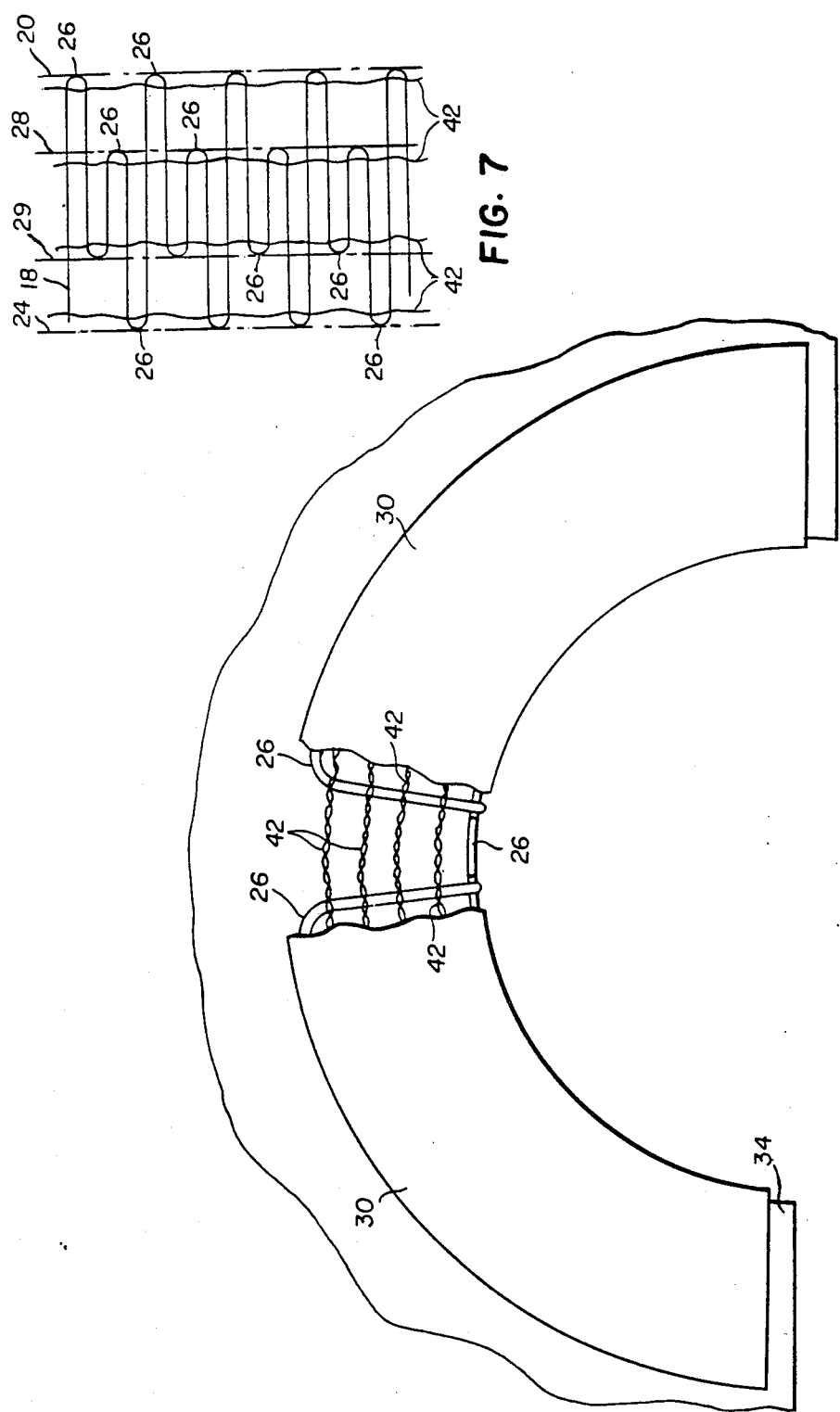

SINGLE-WIRE CARRIER EDGE PROTECTOR TRIM STRIP

BACKGROUND OF THE INVENTION

1. Field of the Invention

This invention relates generally to wire carrier edge protector trim strips. More particularly, this invention relates to a single-wire carrier formed from a continuous metallic serpentine wire having oppositely facing edge portions or bights located along the edge lines of the carrier and at least along one other line parallel to and interposed between the edge lines.

2. Description of the Prior Art

Lansing, U.S. Pat. No. 3,198,689 discloses a wire carrier edge protector trim strip in which the wire carrier comprises a continuous, serpentine wire having lengths thereof extending transversely of the carrier and longitudinally spaced from one another. The wire lengths are stayed and maintained in their spaced relation with one another by interweaving with them a plurality of strands of material randomly located transversely of the wire lengths from one edge to the other. In Lansing, the wire carrier is coated with an elastomeric material while in a flat condition. After the coating operation, the flat coated wire carrier is formed by form rolls into an edge protector trim strip of substantially U-shaped transverse cross section.

U.S. Pat Nos. 4,304,816 and 4,310,164 disclose edge protector trim strips having stamped metal carriers. In U.S. Pat. No. 4,304,816, a flexible substantially inextensible member, such as a polyester tape, is secured to the carrier along one surface thereof to prevent stretching of the strip. In U.S. Pat. No. 4,310,164, an elongated practically inextensible non-metallic strand-like member, such as a thread, is embedded between the sealing and gripping parts of the strip to extend longitudinally thereof and prevent stretching of the strip.

U.S. Pat. Nos. 3,108,338 and 4,107,898 relate to edge protector trim strips having stamped metal, channel shaped, carriers provided with connecting links adjacent the free edges of the channels. The links prevent stretching of the strips along the edges thereof.

It is further known in flush glass automotive design to provide an upper header seal comprising an extended profile having embedded therein two wire carriers of different size.

While the use of two or more wire carriers in a single seal to provide a seal having separately selectable resilient characteristics in a body portion and an extension portion respectively has been practiced to good effect in the past, the same is complex and requires extra manufacturing steps when compared to a seal incorporating a single wire carrier. Heretofore, it has not been recognized that the properties of two-wire carrier seal structure could be obtained with a single wire carrier. This invention provides such a carrier. The wire carrier of this invention combines the high degree of flexibility achieved by two-wire carriers with the low cost and ease of manufacture characteristics of single-wire carriers.

SUMMARY OF THE INVENTION

In accordance with this invention, a single-wire carrier is incorporated in an edge protector trim strip for effectively overcoming problems in the manufacture and use of edge protector trim strips. These problems have been solved in a simple, convenient and highly effective way by selectively arranging the looped portions or bights of a continuous serpentine wire along the edge lines of the carrier and along one or more lines parallel to and interposed between the edge lines for achieving a wire carrier having one or more longitudinally extending reinforced and unreinforced portions. As used herein, bights means the looped portions of a serpentine wire.

More specifically, the single-wire carrier for use in edge protector trim strips comprises a continuous metallic serpentine wire having oppositely facing looped edge portions or bights joined by lengths of wire extending transversely and spaced from one another longitudinally of the carrier. The bights are selectively arranged along the opposite edge lines of the carrier and along at least one line parallel to and interposed between the edge lines depending upon which longitudinally extending portion of the finished edge protector trim strip it is desired to reinforce. A plurality of strands of material extend longitudinally of the carrier and are interwoven with the lengths of wire to maintain the spaced relation of the wire lengths.

An advantage of the present invention is to provide, among other things, manufacture of edge protector trim strips of improved quality and increased resistance to compression, stretching and deformation of selected longitudinally extending portions thereof.

The invention and its advantages will become more apparent from the detailed description of the invention presented below.

BRIEF DESCRIPTION OF THE DRAWINGS

The details of the invention will be described in connection with the accompanying drawings, in which:

FIG. 1 is a perspective view of a portion of an edge protector trim strip embodying the principles of this invention, the trim strip further having the coating removed at one end thereof to show the single-wire carrier;

FIG. 2 is a section view taken substantially along line 2—2 of FIG. 1;

FIG. 3 is a top plan view of the single-wire carrier of FIG. 1 in a flat condition prior to being bent into a channel shape;

FIG. 4 is a side elevational view of the trim strip of FIG. 1 mounted on a flange defining a sharp radius, and with a portion of the coating omitted to show the compression resistant single-wire carrier; and FIGS. 5–8 are top plan views of different embodiments of a flat single-wire carrier before being bent into a single-wire channel-shaped carrier.

DETAILED DESCRIPTION OF THE INVENTION

Figure 8:
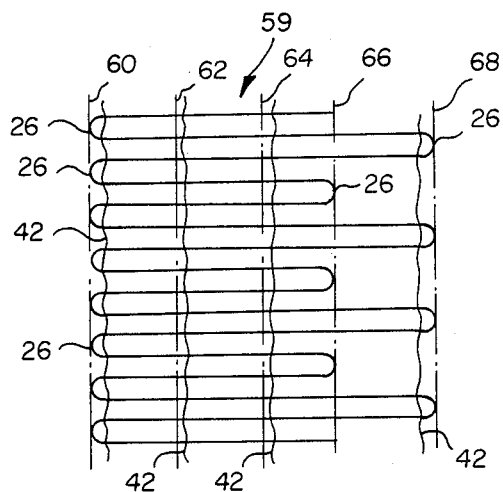

With reference to FIGS. 1–3, a preferred embodiment of an edge protector trim strip 10 of this invention is disclosed. The trim strip comprises a bendable supporting channel-shaped single-wire carrier 12 of substantially U-shaped single-wire section, having a central or base portion 14 and opposite, upwardly extending edge portions 16.

The single-wire carrier 12 comprises a continuous serpentine metal wire 18 having lengths 22 of wire extending transversely of the carrier and in spaced relation with one another longitudinally thereof, as shown.

These lengths 22 of wire are joined together by looped edge portions or bights 26 to form the continuous serpentine wire.

The wire 18 may be formed of a tempered carbon steel, for example, having a tensile strength between 56,250 and 69,750 kg.s.cm (125,000 and 155,000 p.s.i.) and a diameter of about 0.76 cm (0.03 inch). Such wire is of sufficient rigidity to jointly maintain the channel shape of the trim strip, subject to bending of the wire loops and lengths individually, to enable the trim strip as a whole to be readily bent to conform to and fit differently curved edges of structural flanges. The multiplicity of wire loops, acting in unison, maintain the channel shape of the trim strip and support a coating 30 and clamping fins 32 while the wire lengths yield sufficiently to provide the desired flexibility and compression resistance required of the trim strip.

The bights 26 of wire 18 are selectively arranged in a cyclically predetermined order with some of the bights located along a first edge line 20 of the carrier, others along the opposite second edge line 24, and still others along third and/or fourth lines 28, 29 respectively interposed between and parallel to the edge lines, as best seen in FIG. 3. By varying the location of bights 26 of wire 18 in a cyclically predetermined order, it is possible to selectively reinforce different longitudinally extending portions of a finished trim strip 10. For example, as seen in FIG. 3, bights 26 of wire 18 are arranged in succession in a cycle with a bight along the first edge line 20, a bight along the fourth line 29, a bight along the first edge line 20, and a bight along the second edge line 24. When the carrier is bent into a channel shape and coated with an elastomeric material, a finished trim strip 10 is obtained (FIG. 1) in which the base 36 and one side portion 38 thereof is reinforced. The reinforced base and side portion resist deformation, buckling and compression when the trim strip is mounted on a flange 34 defining a sharp radius, as best seen in FIG. 4.

With reference to FIGS. 5-8, different embodiments of the single-wire carrier 12 are disclosed. In FIG. 5, bights 26 are arranged in succession in a cycle with a bight along first edge line 20, a bight along third line 28, a bight along first edge line 20, and a bight along second edge line 24. After bending and coating, a finished trim strip 10 results in which a side portion 38 thereof resist deformation, buckling, and compression when the trim strip is mounted on a support flange.

With reference to FIG. 6, bights 26 are arranged in succession in a cycle with a bight along first edge line 20, a bight along third line 28, a bight along first edge line 20, a bight along second edge line 24, a bight along fourth line 29, and a bight along second edge line 24. When the single-wire carrier is bent and coated with an elastomeric coating 30, a finished trim strip 10 is obtained having reinforced side portion 38.

With reference to FIG. 7, bights 26 are arranged in succession in a cycle with a bight along first edge line 20, a bight along fourth line 29, a bight along third line 28, and a bight along second edge line 24. When the single-wire carrier is bent and coated with an elastomeric coating 30, a trim strip 10 is obtained having a reinforced base 36.

Figure 9:
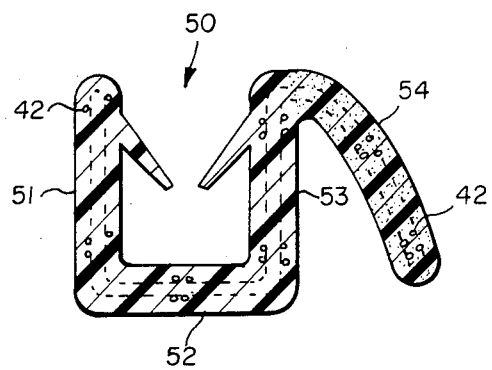
FIG. 9 is a section view of a trim strip based on the wire carrier of FIG. 8 and including a sealing member.

With reference to FIGS. 8 and 9, bights 26 are arranged in succession in a cycle with a bight along first edge line 60, a bight along fourth line 68, a bight along line 60 and a bight along third line 66. When the single-wire carrier is bent and coated with an elastomeric coating 30, a trim strip substantially as shown in FIG. 9 is produced. Referring now to FIG. 9, trim strip 50 includes a body portion 52 and a flexible sealing portion 54 appended thereto.

Preferably, the trim strip of FIG. 9 has a first relatively dense elastomeric body portion 52 surrounding the densely woven body portion of wire carrier 12 and a second less dense sealing portion 54 surrounding the loosely woven portion of wire carrier 12. In this way, a wire carrier is produced having a relatively rigid holding portion in combination with a relatively flexible sealing portion which trim strip can be formed from a single-wire carrier and extruded in a single dual extrusion process. Significant cost savings accompany such structure.

After bending and coating, the finished trim strip 50 results in which the U-shaped body portion 52 thereof resists deformation, buckling and compression when the trim strip is mounted on a support flange while sealing portion 54 is sufficiently flexible to provide a seal against a movable panel.

Before the single-wire carrier 12 in any of the embodiments hereinabove described is bent into a channel shape and coated with an elastomeric material to form a finished trim strip 10 having resilient and compressible fins 32 extending longitudinally of the strip, the bights or looped edge portions 26 and lengths 22 of wire 18 are stayed and maintained in their spaced relation with one another by interweaving with them a plurality of strands 42 of material. The material may be of any suitable type such as polyester, cotton, fiberglass or light wire, for example, capable of maintaining the spacing between wire lengths 22 of wire carrier 12 without interfering materially with its flexibility.

While presently preferred embodiments of the invention have been shown and described with particularity, it will be appreciated that various changes and modifications may suggest themselves to one having ordinary skill in the art upon being apprised of the present invention. It is intended to emcompass all such changes and modifications as fall within the scope and spirit of the appended claims.

I claim:

1. A longitudinally extending wire carrier of a finite width defined by parallel spaced apart first and second edge lines for use in an edge protector trim strip comprising:

a continuous metallic serpentine wire having a plurality of looped portions along said first edge line, a plurality of looped portions along said second edge line, and a plurality of looped portions along a least one other line parallel to and interposed between and spaced apart from each of said first and second edge lines, said wire further having lengths of said wire extending transversely and spaced from one another longitudinally of said carrier for joining said looped portions together to form said serpentine wire having a longitudinally extending reinforced and unreinforced portions, said reinforced portion having a greater number of said lengths of wire per unit of length of said carrier than said unreinforced portion of said carrier; and a plurality of strands of material extending longitudinally of said carrier and interwoven with said lengths of said wire to maintain the spaced relation of said wire lengths thereof.

2. The invention according to claim 1 wherein said looped portions along said first, second and other line cyclically recur in a predetermined order.

3. The invention according to claim 2 wherein in succession in a cycle, the first looped portion is along said first edge line, the next looped portion is along said other line, the next looped portion is along said first edge line, and the last looped portion is along said second edge line.

4. The invention according to claim 1 wherein said other line is a third line, and said wire further has a plurality of looped portions along a fourth line interposed between and spaced apart from said third line and one of said first and second edge lines.

5. The invention according to claim 4 wherein said looped portions cyclically recur in a predetermined order.

6. The invention according to claim 5 wherein in succession in a cycle, the first looped portion is along said first edge line, the next looped portion is along said third line, the next looped portion is along said first edge line, the next looped portion is along said second edge line, the next looped portion is along said fourth line, and the last looped portion is along said second edge line.

7. The invention according to claim 5 wherein in succession in a cycle, the first looped portion is along said first edge line, the next looped portion is along said fourth line, the next looped portion is along said third line, and the last looped portion is along said second edge line.

8. The invention according to claim 1 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said carrier.

9. The invention according to claim 2 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said compressible fins extending longitudinally of said carrier.

10. The invention according to claim 3 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said carrier.

11. The invention according to claim 4 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said carrier.

12. The invention according to claim 5 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said carrier.

13. The invention according to claim 6 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said carrier.

14. The invention according to claim 7 wherein said wire carrier is substantially U-shaped in transverse cross section to form a base and opposed side portions, and a coating of flexible, resilient elastomeric material is secured to said wire carrier to form an edge protector trim strip, said coating being formed at the inner sides of said side flanges with resilient and compressible fins extending longitudinally of said carrier.

* * * * *